June 19, 1962    JYUNICHI GOTO    3,039,704
GRANULATING APPARATUS

Filed Feb. 1, 1960    3 Sheets-Sheet 1

INVENTOR.
JYUNICHI GOTO
BY
Wenderoth, Lind & Ponack
attys

June 19, 1962   JYUNICHI GOTO   3,039,704
GRANULATING APPARATUS
Filed Feb. 1, 1960   3 Sheets-Sheet 2

INVENTOR.
JYUNICHI GOTO

June 19, 1962  JYUNICHI GOTO  3,039,704
GRANULATING APPARATUS

Filed Feb. 1, 1960  3 Sheets-Sheet 3

INVENTOR.
JYUNICHI GOTO
BY Wenderoth, Lind & Ponack
ATTORNEYS

United States Patent Office 3,039,704
Patented June 19, 1962

3,039,704
GRANULATING APPARATUS
Jyunichi Goto, 519 Ohmiya, Fujimiya City, Japan
Filed Feb. 1, 1960, Ser. No. 5,871
2 Claims. (Cl. 241—159)

This invention relates to an improved arrangement of granulating elements involving a new principle whereby coffee is granulated to a predetermined degree of absolute uniform fineness.

Several different methods of making coffee are known in order to secure the most satisfactory results, and in each case it is desirable that the coffee be granulated to a predetermined degree of fineness. For example, coffee should be quite coarsely ground for use in the open pot method, and should be more finely ground for the drip method. However, the most important point for making good coffee lies in the provision of the coffee granulated completely and entirely to a uniform fineness, whether it is coarsely or finely ground. If the finished coffee contains a substantial amount of coffee particles more finely divided than the predetermined degree of fineness, the flavor of coffee is not fully extracted to deteriorate its taste too.

Prior art discloses a coffee mill consisting of the grinding rolls which comprises a slow speed circumferentially ribbed roll and a high speed oppositely driven longitudinally ribbed roll. However, the formation of finely divided coffee is unavoidable, because coffee has to pass between the end of a rib of the circumferentially ribbed roll and that of another rib of the longitudinally ribbed roll which are in crossing relation. The conventional coffee has been made with a view to attaining a homogeneous ground coffee product of the fineness desired, yet the finished coffee resulting therefrom contains a substantial amount of coffee of irregular and non-uniform fineness, particularly of very finely divided state. In addition, the spacing means between the grinding rolls of the conventional coffee mill is provided for the control of the degree of fineness of grind of coffee, but the control of this type has never been satisfactory.

The present invention contemplates the provision of a novel coffee mill which overcomes the above disadvantage resulting from the coffee mill of prior art.

Furthermore, in accordance with the principle of granulating a dry food stuff by this invention, bread-crumb for use in cooking having a homogeneous fineness can be easily obtained, too. As the bread stuff for making bread-crumb is very fragile, the production of bread-crumb for use in cooking having a uniform fineness has been heretofore very difficult, because it is easily ground into a very finely divided state of powder.

Coffee is entirely different from the bread-crumb for cooking in its hardness, but, in accordance with the granulating apparatus of my invention, the finished coffee product having a uniform and homogeneous fineness heretofore unable to attain can be obtained.

It is a principal object of the invention to provide a dry food stuff granulated to a homogeneous fineness desired.

It is a further object to provide an arrangement of granulating elements involving a novel principle in the granulating process of a dry food material, and more particularly, coffee.

It is another object to provide a finished coffee product granulated to the fineness desired, and yet free from heat resulting from the granulating process in which neither friction nor impact takes place while, on the other hand, the conventional coffee mill grinds a coffee heated to some extent by the friction and impact given thereto during the grinding process, thus deteriorated in its flavor and taste by this heat.

These and other objects, uses, and advantages of the invention will become apparent to those skilled in the art from the following detailed description in connection with the accompanying drawings in which.

Briefly stated, the present invention comprises providing a pair of opposed granulating elements rotatable at the same speed in different directions spaced from each other by a gap smaller than the size of a grain of dry food stock to be processed, each of the granulating elements being provided with a number of circumferential ribs on the surface thereof, the size of each rib being selected in such manner that it is smaller than each grain of the dry food stock in diameter, length and width, providing each rib of the opposed granulating elements in staggered relation in the same plane, and subjecting the dry food stock to being divided through the granulating elements in such manner that each grain is divided as if spanning as a bridge between the edges of at least two ribs.

Figure 9:
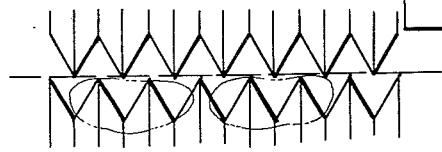
FIG. 9 is an enlarged view of the ends of ribs on opposed elements between which a coffee bean is to be granulated.
Figure 10:
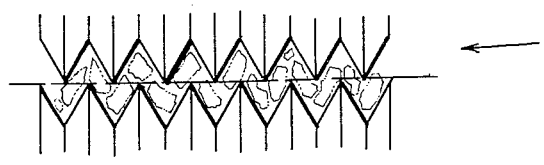
FIG. 10 is the same as FIG. 9, but the coffee bean has been divided into several pieces.
Figure 11:
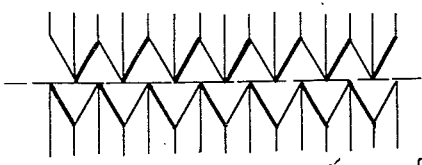
FIG. 11 is the same as FIGS. 9–10, but the coffee bean divided into several pieces is dropped downwardly.

Referring to the expression, "each grain is divided as if spanning as a bridge between the edges of at least two ribs," which is a novel principle of this invention, reference will be had to FIGS. 9–10, which illustrates the above principle clearly. As shown in FIGS. 9–11, the edge or point of each rib on a roll of a pair of opposed rolls is staggered so as to lie between a pair of adjacent ribs on the opposed roll so that the two edges of two ribs of opposed rolls are not in direct contact with each other. Moreover, the ribs on each roll of a pair of opposed rolls extend toward the ribs on the opposed roll to a point even with the ends of the ribs on the opposed roll, so that the distal ends of all the ribs on a pair of opposed rolls pass through a single point looking from the direction of the arrow of FIG. 10, and lie on the single dashed line. Such being the construction, when a coffee bean spans as a bridge between the edges of at least two ribs or more than two ribs of oppositely driven rolls at the same speed as it is fed from a hopper above, it is divided or crushed by the edge of a rib with neither friction nor impact between the edges of opposed ribs of the rolls.

Figure 1:
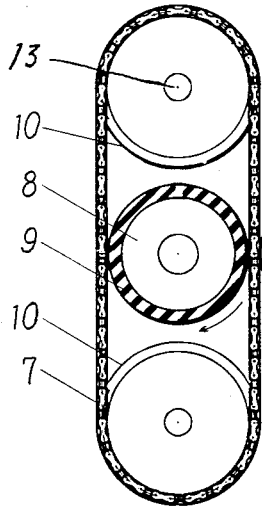
FIG. 1 is a side view of the apparatus for carrying out a preferred embodiment of the invention.
Figure 2:
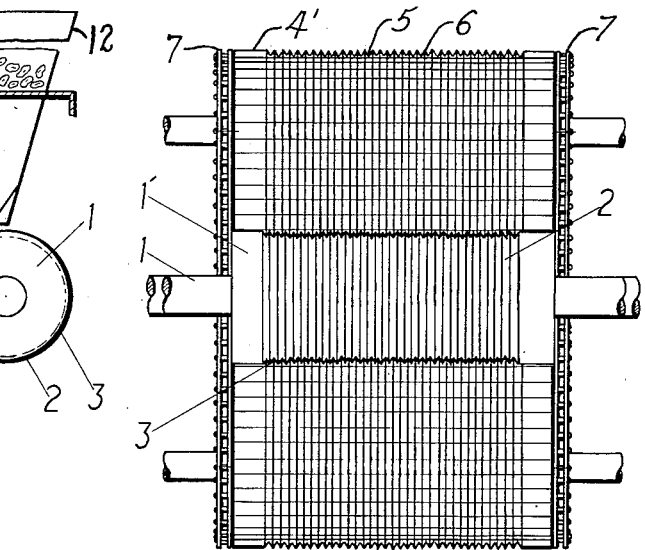
FIG. 2 is a front view of the apparatus of FIG. 1.
Figure 3:
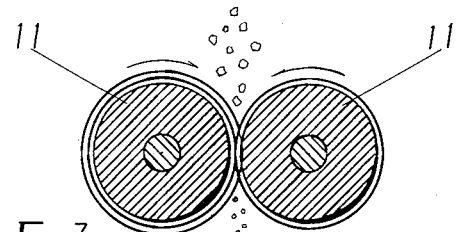
FIG. 3 is a side view of a pair of rolls provided with a number of circumferential ribs embodying the principle of the invention.
Figure 4:
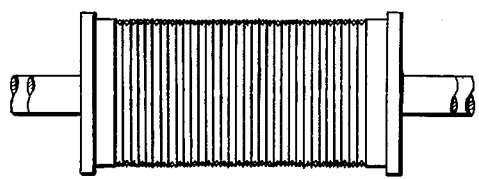
FIG. 4 is a front view of the rolls of FIG. 3.
Figure 5:
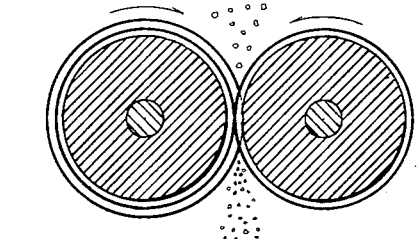
FIG. 5 is a side view of another pair of rolls provided with the similar ribs of FIG. 3.
Figure 6:
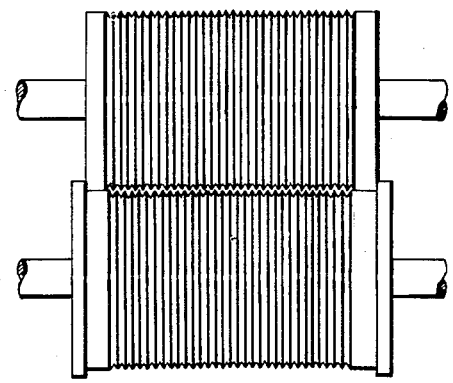
FIG. 6 is a top plan view of the rolls of FIG. 5.

Referring to FIG. 1 in detail, a granulating roll 1 is provided with a number of circumferential ribs 3 and a number of recesses 2 therebetween. A Venetian blind like granulating element consists of a number of slats 4 provided with a number of ribs 6 in the same direction as those of the roll 1 and a number of recesses 5 therebetween, and on its both ends a chain 7 which engages with a wheel cog provided on a shaft 13. Within the Venetian blank like element, there are an upper shaft and a lower shaft each of which are provided with a cog wheel at both ends thereof, and an elastic roll made of an iron roll body 8 and an elastic covering 9 thereon.

Both ends of the granulating roll 1 are smooth with no circumferential ribs thereon in order to provide means 1' for holding the ends of the opposing ribs out of contact with one another between the opposed granulating means. Similarly, no circumferential ribs are provided on both ends 4' of the Venetian blind like granulating means. In addition, if a coarser granule of coffee bean is desired, a corresponding space may be provided between the opposing granulating rolls. In general, a coffee product of the fineness desired in accordance with my invention depends primarily upon the number of ribs per unit length, and secondarily, upon the extent of space between the opposing granulating rolls.

As shown in FIG. 1, at the first stage of the granulating apparatus in accordance with my invention, the roasted coffee beans are fed into a hopper 12 from which they are continuously discharged to the granulating means in a uniform row.

It is to be noted that the oppositely driven granulating means of the invention is driven at the same speed while, on the other hand, the conventional cracking rolls of a coffee mill which comprises a high speed roll and a low speed roll are driven at a different speed. This is an important feature of my invention which is free from heat resulting from the friction caused by the difference of speed of cracking rolls. Another important feature of my invention lies in the use of a Venetian blind or caterpillar like granulating means instead of a circumferentially ribbed roll as one of the cracking rolls at the first stage of the granulating operation.

If a pair of opposed circumferentially ribbed rolls are employed at the first stage, they must be of a very large diameter so as to engage the coffee beans between the rolls. By the application of this cracking means at the first stage, the coffee granulator of my invention can be made as of a compact type.

The purpose and function of the elastic roll made of an iron roll body 8 covered with an elastic material thereon is to support the Venetian blind like granulating means from the inside towards the granulating roll 1 and eliminate the noise resulting from the friction between the Venetian blind like granulating means and the elastic roll, and besides, the Venetian blind like element can retreat somewhat, because the cover 9 of the inside roll 8 is of an elastic material. It is to be understood that the roll 8 is not driven by an independent driving means, but by the friction caused by the movement of the Venetian blind like element. It is also understood that the roll 1 and the Venetian blind like element are driven in opposite directions at the same speed by a suitable known driving means which is not shown in the drawings.

The manner in which a coffee bean is granulated between the Venetian blind like element and a roll is similar to the manner in which a coffee bean is granulated between two rolls. The edge or point of each rib on a roll or a Venetian blind like element of an opposing roll and Venetian blind like element is staggered so as to lie between a pair of adjacent ribs on the opposed ribbed element, so that two edges of two ribs of opposed ribbed elements are not in direct contact with each other. Moreover, the ribs on each element of a pair of opposed ribbed elements extends toward the ribs on the opposed element to a point even with the ends of the ribs on the opposed element, so that the distal ends of all the ribs on a pair of opposed elements pass through a single point looking from the ends of the elements and lie on a line between the elements. Such being the case, when a coffee bean spans as a bridge between the edges of at least two ribs of a roll and a Venetian blind like element driven at the same speed in opposite directions, it is divided or crushed by the edge of a rib, and there is neither friction nor impact between the edges of opposed ribs on the roll and the Venetian blind like element.

Thus, the granulating operation at the first stage ends.

Coffee beans granulated by the first stage granulating step are now fed to the second stage granulating step and then to the third stage granulating step.

The granulating operations at the second and third stages are carried out by a pair of opposed granulating rolls provided with circumferential ribs as shown in FIGS. 3–6.

The coffee granulator of my invention includes the first stage granulating means consisting of a Venetian blind or caterpillar like granulating element and a granulating roll both of which are provided with circumferential ribs on the surface thereof, the second stage granulating means consisting of a pair of opposed circumferentially ribbed rolls, and the third stage granulating means consisting of a pair of opposed circumferentially ribbed rolls, and besides, a housing H is provided to house the above three stages granulating means. A discharge outlet D is also provided therefor. A suitable equal speed driving means for driving the granulating means is provided, too.

Referring to the number of ribs per 30 mm. of the granulating means of my invention, it is preferred as below:

| | Number of ribs |
|---|---|
| First stage | 12 per 30 mm. |
| Second stage | 24 per 30 mm. |
| Third stage | 28 per 30 mm. |

It will be understood that the above number of ribs per 30 mm. are applied only to a coffee granulator and illustrative only, and not limited. Further, the number of ribs per 30 mm. are applied to the Venetian blind or caterpillar granulating means as well as the roll.

The diameter of the second stage rolls is the same as that of the first stage roll, but the second stage rolls are driven a little faster than the first stage roll. In addition, the third stage rolls are the largest and driven at the fastest speed of the three.

When coffee beans cracked and granulated by the first stage means are fed to the second stage granulating means to be granulated, those already granulated to the degree of fineness to be obtained by the second stage means or less than that of fineness will pass between the second cracking or granulating rolls without being granulated thereby and are fed as such to the third cracking or granulated rolls. In other words, the coffee beans cracked and granulated by the last stage granulating step are those having the desired degree of fineness, because the finished coffee product with the desired degree of fineness can be obtained by the last stage granulating rolls. In this respect, my invention has an advantage that no sieves are required to obtain the finished coffee product with the predetermined degree of uniform fineness, because very finely divided particles of coffee beans are hardly produced by the process of my invention.

If an elongated granule of coffee bean which passes the space of ribs is formed by the first granulating means, it is easily granulated to the desired degree of fineness by the second or third granulating rolls, because the first, second and third cracking means are somewhat laterally displaced relative to one another to the left or right in the direction of the axis of rotation thereof so an elongated granule of coffee bean will not fall straight through the second and third granulating means, but will be directed in the horizontal direction to the granulating means.

Figure 7:
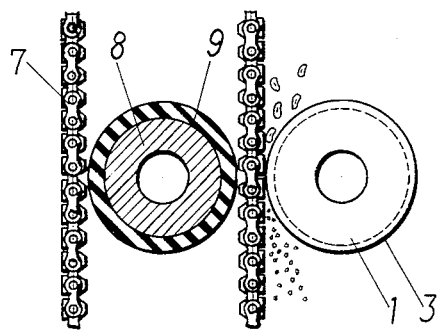
FIG. 7 is an enlarged side view of the central part of the apparatus of FIG. 1.
Figure 8:
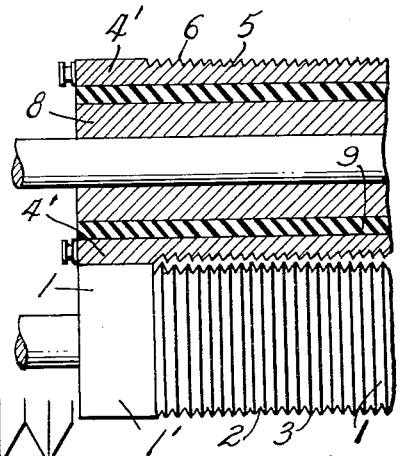
FIG. 8 is a top plan view of the part of the apparatus of FIG. 7.

FIGS. 7–8 show the first stage cracking or granulating operation in an enlarged scale, including a side and a plan view, respectively.

Figure 12:
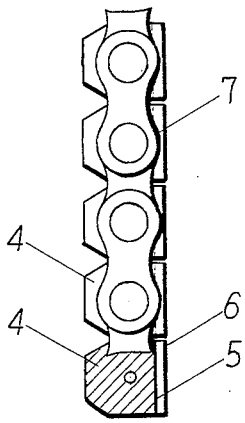
FIG. 12 is a side view of the Venetian blind element.
Figure 13:
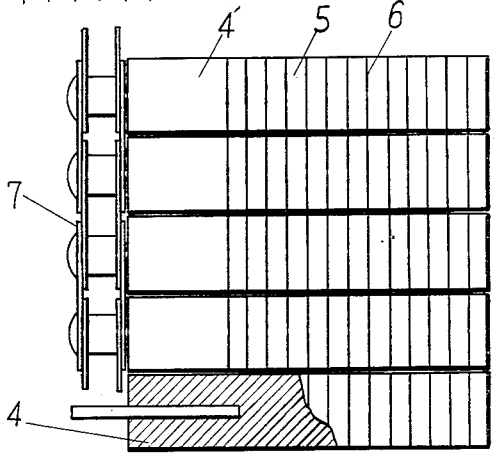
FIG. 13 is a front view of the element of FIG. 12.
Figure 14:
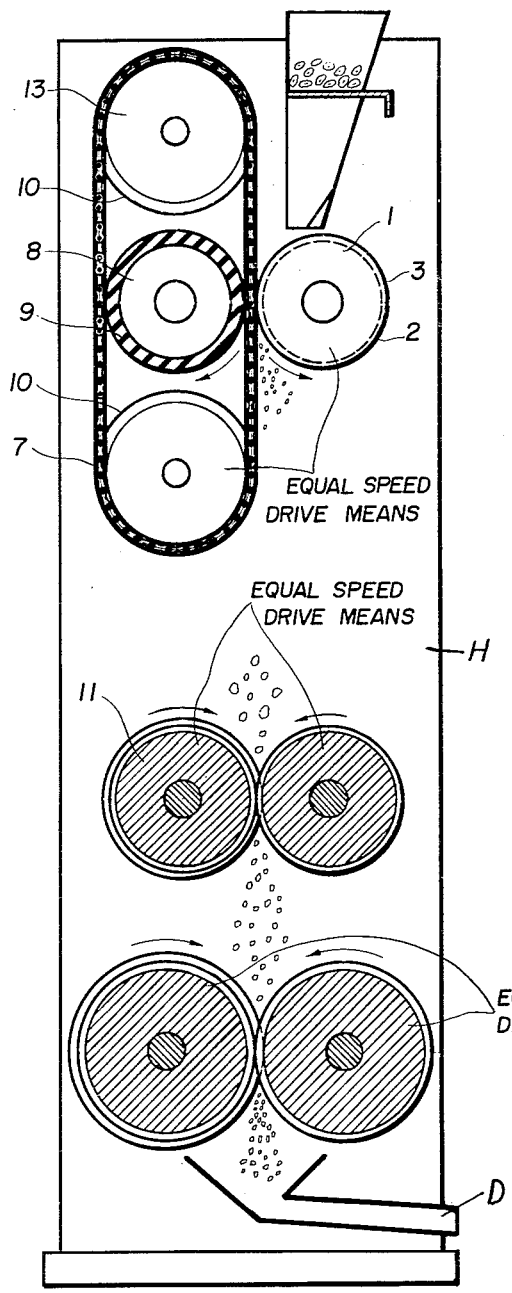
FIG. 14 is a schematic side view, partly in section, of an apparatus with the granulating elements of FIGS. 1–6.
Figure 15:
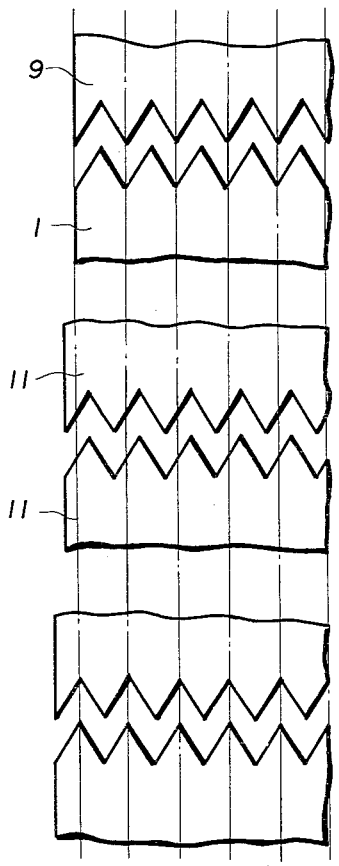
FIG. 15 is a representation of the manner in which the rolls are offset from each other.

FIGS. 12–13 illustrate the driving mechanism by which the Venetian blind or caterpillar like element is driven by a chain 7 and a wheel cog 10. The Venetian blind like element consists of a number of slats 4 provided with a number of ribs 6 having a number of recesses 5 therebetween. The chain 7 engages with a pin secured to the slat. When the shaft 13 with a cog wheel 10 at both ends thereof is driven by a suitable motor (not shown), the Venetian blind like element is driven in the direction of an arrow by the driving force transmitted from each slat with a pin through the chain which engages with the cog wheel 10 secured to the shaft 13.

Lastly, it is to be noted that the difficulty of removing the chaff or silver skin of a coffee bean has been overcome by my invention, because it will be easily understood from the principle of my invention that the silver skin which is soft and light will not be cracked by a series of the granulating process of my invention with the result that it remains on the finished coffee product as such and easily removed.

It is thought that the invention and many of its attendant advantages will be understood from the foregoing description, and it will be apparent that various changes may be made in the form, construction and arrangement of the parts without departing from the spirit and scope of the invention, the form hereinbefore described being merely a preferred embodiment thereof.

I claim:

1. An apparatus for granulating a dry food stock, comprising a plurality of pairs of opposing granulating members, each of said granulating elements being provided with a plurality of ribs on the surface thereof all extending in the direction in which the elements move where they oppose each other, each pair of said granulating members being spaced with each rib on an opposed element being offset laterally so as to be between two ribs on the opposed element and the ribs on both granulating members extending toward the opposing granulating members to a point even with the ends of the ribs on said opposing granulating member, each succeeding pair of granulating members being laterally offset from the pair of granulating members preceding it, means connected to said granulating members for moving the adjacent portions of said granulating members at the same speed in the same direction, whereby when the food stock to be granulated is passed between said two granulating elements, it is subjected to cracking as the grains span the ribs of the granulating elements.

2. An apparatus for granulating a dry food stock, comprising a circumferentially ribbed roll, an opposed endless chain-like element having a plurality of laterally extending slats, said slats having ribs thereon extending in the same direction as the ribs on the circumferentially ribbed roll, the dimension of each rib in the direction toward the opposed ribs being smaller than each grain of food stock prior to granulating, said roll and endless chain like element being spaced with each rib on the roll being offset laterally so as to be between two ribs on the chain-like element, and the ribs on the roll extending toward the chain-like element to a point even with the ends of the ribs on said chain-like element, means connected to said roll and chain-like element for moving the adjacent portions thereof at the same speed and in the same direction, whereby when the food stock to be granulated is passed between said roll and said chainlike element, it is subjected to cracking as the grains span the ribs of said roll and said chain-like element.

References Cited in the file of this patent

UNITED STATES PATENTS

| | | |
|---|---|---|
| 293,270 | Penfield | Feb. 12, 1884 |
| 313,987 | Burckhardt | Mar. 17, 1885 |
| 405,177 | Quenehen et al. | June 11, 1889 |
| 702,933 | Edwards | June 24, 1902 |
| 871,176 | McCargar | Nov. 19, 1907 |
| 1,584,869 | Ladd | May 18, 1926 |
| 1,618,721 | Norman | Feb. 22, 1927 |
| 1,766,325 | Bosc | June 24, 1930 |
| 1,773,476 | Chamberlain | Aug. 19, 1930 |
| 2,575,057 | Keiper | Nov. 13, 1951 |

FOREIGN PATENTS

| | | |
|---|---|---|
| 2,706 | Great Britain | Oct. 29, 1861 |
| 6,990 | Austria | Mar. 10, 1902 |
| 25,259 | Great Britain | of 1901 |
| 29,175 | Great Britain | May 7, 1913 |
| 433,001 | Great Britain | Aug. 7, 1935 |
| 461,899 | France | Nov. 10, 1913 |
| 720,190 | Germany | Apr. 28, 1942 |